United States Patent
Wang et al.

(10) Patent No.: US 8,780,593 B2
(45) Date of Patent: Jul. 15, 2014

(54) POWER COMPENSATION APPARATUS AND METHOD FOR RENEWABLE ENERGY SYSTEM

(75) Inventors: Chang-Yong Wang, Shanghai (CN); Qing Chen, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 115 days.

(21) Appl. No.: 13/324,434

(22) Filed: Dec. 13, 2011

(65) Prior Publication Data
US 2013/0051105 A1    Feb. 28, 2013

(30) Foreign Application Priority Data

Aug. 22, 2011  (CN) .......................... 2011 1 0240936

(51) Int. Cl.
*H02M 7/5387*  (2007.01)
*H02M 7/797*   (2006.01)

(52) U.S. Cl.
USPC .......................................... 363/71; 323/207

(58) Field of Classification Search
USPC ........ 363/56.05, 71, 95, 97, 98, 132, 40, 131; 323/205, 207
See application file for complete search history.

(56) References Cited

U.S. PATENT DOCUMENTS

| | | | |
|---|---|---|---|
| 5,532,575 A * | 7/1996 | Ainsworth et al. | 323/211 |
| 6,697,271 B2 * | 2/2004 | Corzine | 363/71 |
| 7,079,406 B2 * | 7/2006 | Kurokami et al. | 363/56.03 |
| 7,436,155 B2 * | 10/2008 | Renken | 323/207 |
| 7,830,687 B2 * | 11/2010 | Du et al. | 363/71 |
| 2011/0205768 A1 * | 8/2011 | Svensson | 363/49 |

OTHER PUBLICATIONS

Fujii et al., "A novel DC-link voltage control of PWM-switched cascade cell multi-level inverter applied to STATCOM", Industry Applications Conference, 2005. Fourtieth IAS Annual Meeting. Conference Record of the 2005, Publication Year: 2005, pp. 961-967 vol. 2.*

Jianlin et al., "APF based on multilevel voltage source cascade converter with carrier phase shifted SPWM", TENCON 2003. Conference on Convergent Technologies for the Asia-Pacific Region, Publication Year: 2003, pp. 264-267 vol. 1.*

* cited by examiner

*Primary Examiner* — Gary L Laxton
(74) *Attorney, Agent, or Firm* — CKC & Partners Co., Ltd.

(57) ABSTRACT

A power compensation apparatus for a renewable energy system includes a plurality of converter modules positioned between any two phases of a three-phase AC electrical grid, each converter module including a plurality of inverter circuits connected in series. Each inverter circuit includes an energy storage unit for providing a direct current (DC) voltage; a capacitor connected to the energy storage unit; and an H-bridge circuit converting the DC voltage into an alternating current (AC) voltage. The converter modules perform reactive power compensation and active power regulation on the electrical grid in a delta connection. A plurality of converter modules are respectively positioned between any two phases of the electrical grid in a delta connection, so as to keep the voltage of the electrical grid continuously stable when the voltage of the electrical grid fluctuates, and also compensate load current when system load is not balanced.

13 Claims, 5 Drawing Sheets

POWER COMPENSATION APPARATUS AND METHOD FOR RENEWABLE ENERGY SYSTEM

RELATED APPLICATIONS

This application claims priority to Chinese Application Serial Number 201110240936.8, filed Aug. 22, 2011, which is herein incorporated by reference.

BACKGROUND

1. Field of Invention

The present invention relates to power compensation techniques used for an alternating current (AC) electrical grid, and more particularly relates to a power compensation apparatus and a power compensation method which are suitable for use in a renewable energy system.

2. Description of Related Art

For an electrical grid, there are two types of electrical power for a power supply load, which includes active power and reactive power. The active power is the electrical power required for maintaining normal operation of a powered device; and, the reactive power is relative abstract, which is the electrical power used in electric and magnetic fields of an electrical circuit for creating and maintaining a magnetic field in an electrical apparatus. Generally, any electrical apparatus with magnetic coils has to consume reactive power for creating a magnetic field, and since no work will be done when the magnetic field is built, the process is refereed to as "no work".

Currently, with the increasing energy crisis and environmental issues, countries all over the world are vigorously developing renewable energy business, such as wind power generation and solar energy generation. Taking the wind power generation as an example, the installed wind power capacity in China grows rapidly, from a stall-regulated wind power system to a variable-speed and constant-frequency (VSCF) wind power system, and from a wind power system with a gearbox to a direct-drive wind power system without the gearbox. For a stall-regulated wind asynchronous-generator, it needs to absorb lagging reactive power from an electrical grid to create a magnetic field and satisfy magnetic requirements, as well as to compensate reactive power consumed by excitation. However, in common medium or large scale induction machines, the excitation current is about 20%-25% of the rated current, and thus the reactive power required by excitation amounts to 20%-25% of the generator capacity. Thus, the overall reactive power required by an induction generator is about 25%-30% of the generator capacity. This will significantly increase the reactive power load in the electrical grid, resulting in power factor (PF) decrease of the network and voltage decrease and line-loss increase of the network, thereby affecting the stability of the electrical grid. Moreover, the active power outputted by the wind power system varies with the wind speed, and when the active power outputted by a generator is not balanced with the load power of a powered device, frequency of the electrical grid changes and thus endangers the stability of the electric power system.

In the prior art, one solution is to use a static var compensator (SVC). The SVC includes a reactor and a capacitor, wherein switching of the reactor is controlled by a thyristor because the thyristor has a fast response to a control signal, and the on/off switching times also may not be limited. When the voltage fluctuates, the SVC can adjust the voltage rapidly and smoothly, so as to satisfy the requirements of dynamic reactive power compensation. However, when the thyristor is used to control the switching of the reactor, high-order harmonics is generated, and thus a special filter is needed.

In view of this, it is a problem desired to be solved by this industry regarding how to design a new power compensation technical solution which may not only provide reactive power for controlling the electrical grid voltage, but also achieve a balance between output power and load power when the system is loaded with a balanced or un balanced load.

SUMMARY

With respect to the above-mentioned disadvantages of the conventional wind generator set performing power compensation on an electrical grid, the present invention provides a novel power compensation apparatus and method.

According to an aspect of the present invention, a power compensation apparatus for a renewable energy system is provided, which is adapted to perform reactive power compensation and active power regulation on a three-phase AC electrical grid. The power compensation apparatus includes a plurality of converter modules positioned between any two phases of the electrical grid. The converter module includes a plurality of inverter circuits connected in series, and each inverter circuit has:

an energy storage unit for providing a direct current (DC) voltage;

a capacitor connected to the energy storage unit; and an H-bridge circuit connected to the capacitor in parallel for converting the DC voltage into an AC voltage, wherein the H-bridge circuit has a first bridge arm and a second bridge arm, and a first output terminal on the first bridge arm is electrically connected to one of any two phases of the electrical grid through a coupling device, and a second output terminal on the second bridge arm is connected in series to another inverter circuit adjacent to the inverter circuit, wherein the converter modules are connected in a delta connection.

Preferably, the H-bridge circuit is a two-level H-bridge or a three-level H-bridge.

In a specific embodiment, when the H-bridge circuit is the two-level H-bridge, the first bridge arm or the second bridge arm is formed with two power switches connected in series. Moreover, the power switch also has a reverse freewheeling diode connected in parallel between a first electrode and a second electrode of the power switch.

In another specific embodiment, when the H-bridge circuit is the three-level H-bridge, the first bridge arm or the second bridge arm is formed with a first power switch, a second power switch, a third power switch and a fourth power switch connected in series.

In another specific embodiment, a first clamping semiconductor switching device and a second clamping semiconductor switching device connected in series are arranged between a first node which between the first power switch and the second power switch and a second node which between the third power switch and the fourth power switch, and a third node between the second power switch and the third power switch is electrically connected to one of any two phases of the electrical grid or to another inverter circuit adjacent to the inverter circuit. Furthermore, the capacitor includes a first capacitor and a second capacitor connected in series, and a fourth node between the first capacitance and the second capacitance is electrically connected to a fifth node between the first clamping semiconductor switching device and the second clamping semiconductor switching device.

Preferably, the energy storage unit is a battery, a DC power supply or a super capacitor.

Preferably, the power compensation apparatus further includes a DC-DC converter electrically connected between the energy storage unit and the H-bridge circuit for converting the DC voltage provided from the energy storage unit into a DC input voltage matched with the H-bridge circuit.

Preferably, when the output voltage of the converter module is higher than a voltage of the electrical grid, the converter module outputs inductive reactive power; and when the output voltage of the converter module is lower than the voltage of the electrical grid, the converter module outputs capacitive reactive power. Furthermore, when the voltage of the electrical grid drops, the power compensation apparatus provides reactive power compensation so as to keep the voltage of the electrical grid stable, and provides the active power regulation so as to keep a frequency of the electrical grid stable.

Preferably, the renewable energy system is a wind power system or a solar power system.

According to another aspect of the present invention, a power compensation method for a renewable energy system is provided, which is adapted to perform reactive power compensation and active power regulation on a three-phase AC electrical grid, wherein the method includes the following steps:

providing an energy storage unit for generating a DC voltage;

providing a capacitor connected to the energy storage unit;

providing an H-bridge circuit connected in parallel to the capacitor for converting the DC voltage into an AC voltage, and forming an inverter circuit with the H-bridge circuit, the energy storage unit and the capacitor;

connecting a plurality of the inverter circuits in series so as to form a converter module, and arranging the converter module between any two phases of the electrical grid; and connecting a plurality of the converter modules in a delta connection so as to perform reactive power compensation and active power regulation on the electrical grid.

Preferably, the H-bridge circuit has a first bridge arm and a second bridge arm, wherein a first output terminal on the first bridge arm is electrically connected to one of any two phases of the electrical grid through a coupling device, and a second output terminal on the second bridge arm is connected in series to another inverter circuit adjacent to the inverter circuit.

Preferably, the energy storage unit is a battery, a DC power supply or a super capacitor.

Preferably, the method further includes the following steps: providing a DC-DC converter electrically connected between the energy storage unit and the H-bridge circuit for converting the DC voltage provided from the energy storage unit into the DC input voltage matching the H-bridge circuit.

Preferably, when the output voltage of the converter module is higher than the electrical grid voltage, the converter module outputs the inductive reactive power; and when the output voltage of the converter module is lower than a voltage of the electrical grid, the converter module outputs the capacitive reactive power.

Preferably, when the voltage of the electrical grid drops, the method is used for providing the reactive power compensation and the active power regulation, so as to respectively keep the voltage and a frequency of the electrical grid stable, thereby achieving a low voltage ride through in a transient state.

Preferably, the renewable energy system is a wind power system or a solar power system.

In the power compensation apparatus and method of the present invention, a plurality of converter modules are respectively positioned between any two phases of a three-phase AC electrical grid in a delta connection. The DC voltage from the energy storage unit is converted into an AC voltage through the H-bridge circuit in the converter module, so as to provide the capacitive reactive power compensation or inductive reactive power compensation to the AC electrical grid, thereby keeping the voltage of the electrical grid continuously stable when the voltage of the electrical grid fluctuates. Moreover, unlike the star connection, in the power compensation apparatus of the present invention, the delta-connected converter modules can also compensate the load current when the system load is not balanced. Moreover, active power compensation can also be provided to the electrical grid through the energy storage unit, so as to keep the frequency of the AC electrical grid stable, and thus the power compensation apparatus has the low voltage ride through function in a transient state.

BRIEF DESCRIPTION OF THE DRAWINGS

After reading specific embodiments of the present invention with reference to the accompanying drawings, readers can understand various aspect of the present invention more clearly. In the drawings.

DETAILED DESCRIPTION

Figure 1:
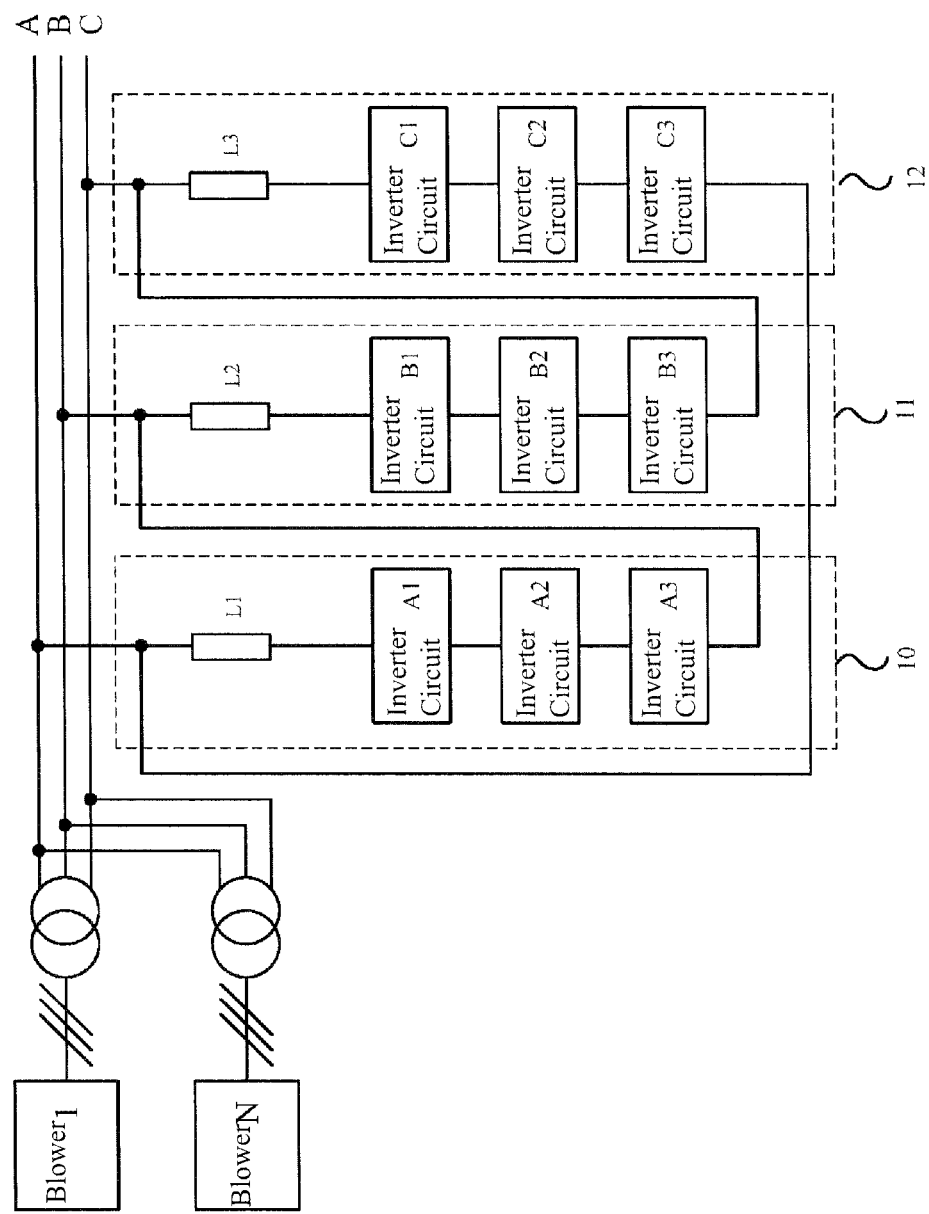
FIG. 1 illustrates an overall structure view of a power compensation apparatus for a renewable energy system according to an aspect of the present invention.

In order to make the technical contents of the present invention more detailed and more comprehensive, various embodiments of the present invention are described below with reference to the accompanying drawings. Wherever possible, the same reference numbers are used in the drawings and the description to refer to the same or like parts. However, those of ordinary skills in the art should understand that the embodiments described below are not used for limiting the scope of the present invention. Moreover, the accompanying drawings are only used for illustration and are not drawn to scale. Specific implementations in various aspects of the present invention are further described in details below with reference to the accompanying drawings.

FIG. 1 illustrates an overall structure view of a power compensation apparatus for a renewable energy system according to an aspect of the present invention. Referring to FIG. 1, a blower 1 is electrically connected to an AC electrical grid after being processed by a machine-side converter, a grid-side converter and after being filtered, and a blower N (N is a natural number larger than 1) is also connected electrically to the AC electrical grid after being processed by a machine-side converter, a grid-side converter and the like and a filtering step, wherein the AC electrical grid includes a three-phase AC voltage, i.e. phase A, phase B and phase C. Those of ordinary skills in the art should understand that FIG. 1 merely describes the wind power system schematically as an example for illustration, but the present invention is not limited thereto. For example, the renewable energy system can also be a solar power system or another energy system.

When a voltage of the electrical grid fluctuates, a power compensation apparatus has to be introduced into the wind power system, and reactive power is outputted to the AC electrical grid through the power compensation apparatus, so as to ensure that the voltage of the electrical grid is kept stable. Although a thyristor in a static var compensator (SVC) may a very fast response to a control signal, and the number of the on/off switching times is not limited, yet high-order harmonics will be generated when the thyristor is used for controlling the switching of a reactor, thus causing various difficulties when the SVC is used for a filtering design. In view of this, it is a problem desired to be solved by this industry regarding how to perform reactive power compensation on the AC electrical grid in real time and rapidly, and how to effectively decrease or eliminate influences on the filtering design of the system caused by a high-order harmonic component.

Referring to FIG. 1 again, the power compensation apparatus of the present invention is adapted to perform reactive power compensation and active power regulation on the three-phase AC electrical grid. The power compensation apparatus includes three converter modules positioned between any two phases of the AC electrical grid, i.e. the converter module 10 arranged between phase A and phase B of the electrical grid (as shown by a dashed block in FIG. 1); the converter module 11 arranged between phase B and phase C of the electrical grid (as shown by a dashed block in FIG. 1), and the converter module 12 arranged between phase C and phase A of the electrical grid (as shown by a dashed block in FIG. 1).

More particularly, the converter module 10 includes a plurality of inverter circuits A1, A2 and A3 connected in series (or called in a concatenation connection); the converter module 11 includes a plurality of inverter circuits B1, B2 and B3 connected in series; and the converter module 12 includes a plurality of inverter circuits C1, C2 and C3 connected in series. The inverter circuit A1 in the converter module 10 is connected to the phase A of the electrical grid through an coupling reactor L1; the inverter circuit B1 in the converter module 11 is connected to the phase B of the electrical grid through a coupling device (such as a reactor L2); and the inverter circuit C1 in the converter module 12 is connected to the phase C of the electrical grid through a coupling device (such as a reactor L3). It should be particularly pointed out that the inverter circuit A3 in the converter module 10 is also electrically connected to the phase B of the electrical grid; the inverter circuit B3 in the converter module 11 is also electrically connected to the phase C of the electrical grid; and the inverter circuit C3 in the converter module 12 is also electrically connected to the phase A of the electrical grid, so that the converter modules 10, 11 and 12 are connected in a delta connection.

Reactive power compensation on the electrical grid performed by the respective converter modules arranged in a delta connection and in a star connection will be described in details below. For a star connection, when the converter modules perform reactive power compensation on the AC electrical grid, the multiple-level inverters connected in series and in a three-phase star connection are connected to the electrical grid through the reactor, and at this time, the output voltage of the serial-connected inverter is substantially controlled by the same-phase voltage in the system voltage. In a case that the system load is balanced, no energy exchange exists between the inverters and the power transmission line of the electrical grid, but the DC capacitors in the converter modules support the electrical grid at a rated voltage. However, in most cases, the load of the three-phase power-supply system is not balanced, and at this time, the multiple-level inverters connected in series and in a three-phase star connection can also be used for compensating the reactive power, but cannot be used for calibrating the unbalance of the system current. If the inverters connected in the star connection is used for compensating the unbalanced load, real-time energy exchange should exist between the inverter and the power transmission line of the electrical grid, but the energy exchange will overcharge or over-discharge the DC capacitors in the inverters, which is contradictory to the basic operating principle of the reactive power compensation performed by the converter modules. In comparison, for the delta connection, when the converter modules performs reactive power compensation on the AC electrical grid, the multiple-level inverters connected in series and in a delta connection are connected to the electrical grid through the reactors, wherein the output voltages of the serial-connected inverters are controlled by the corresponding line voltages. At this time, the multiple-level inverters connected in series and in a delta connection not only can be used for compensating the reactive power (the required reactive power is generated or absorbed because the output current of the inverters always lags behind or exceeds the voltage of the inverters), but also can perform compensation on the unbalanced load current.

Figure 2:
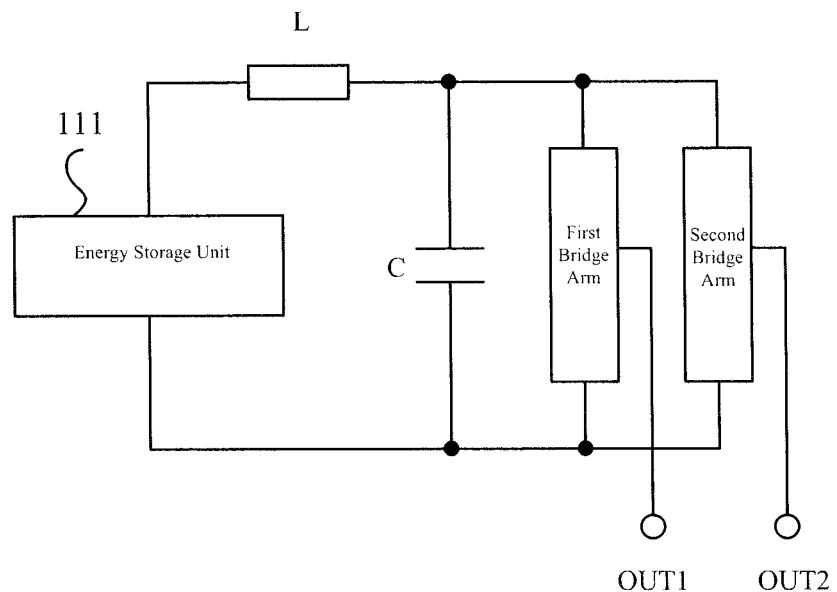
FIG. 2 illustrates a structure block diagram of an inverter circuit in the converter module of FIG. 1.

FIG. 2 illustrates a structure block diagram of an inverter circuit in the converter module of FIG. 1. Preferably, each inverter circuit in the converter modules 10, 11 and 12 uses the entirely same electronic components for circuit design. Taking the inverter circuit A1 as an example, the inverter circuit includes an energy storage unit 111, a coupling reactor L, a capacitor C and an H-bridge circuit. The energy storage unit 111 provides a DC voltage. For example, the energy storage unit 111 can be a battery, a DC power supply or a super capacitor. The capacitor C is connected to the energy storage unit 111 through the coupling reactor L.

Furthermore, the H-bridge circuit is connected to the capacitor C in parallel for converting the DC voltage from the energy storage unit into an AC voltage. For example, the H-bridge circuit is a two-level H-bridge or three-level H-bridge. Specifically, the H-bridge circuit has a first bridge arm and a second bridge arm, wherein the output terminal OUT1 of the first bridge arm is used as an output end of the H-bridge circuit, and the output terminal OUT2 of the second bridge arm is used as another output end of the H-bridge circuit. In a specific embodiment, the output terminal OUT1 is electrically connected to the phase A of the AC electrical grid through the coupling reactor L1, and the output terminal OUT2 is connected in series to another inverter circuit A2 adjacent to the inverter circuit in the same converter module. In another specific embodiment, the converter modules connected in the three-phase delta connection mentioned above are connected to the three-phase AC electrical grid. When the electrical grid voltage fluctuates or drops, the converter modules are used for providing the reactive power, so as to keep the electrical grid voltage stable, and are used for providing the active power in a short moment, so as to keep a frequency of the electrical grid stable, thereby achieving the low voltage ride through function of the system.

Figure 3:
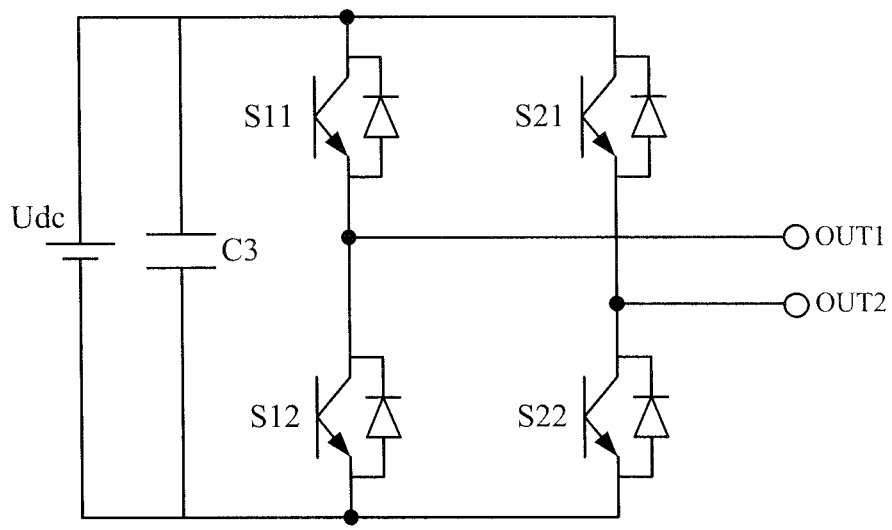
FIG. 3 illustrates a schematic circuit diagram showing a preferred embodiment of the inverter circuit in the converter module of FIG. 2.

FIG. 3 illustrates a schematic circuit diagram showing a preferred embodiment of the inverter circuit in the converter module of FIG. 2. Referring to FIG. 3, when the H-bridge circuit of the inverter circuit is the two-level H-bridge, the first bridge arm or the second bridge arm of the H-bridge circuit is formed with two power switches connected in series. Preferably, the power switch also includes a reverse freewheeling diode connected in parallel between a first electrode and a second electrode of the power switch. For example, the power switch may be an insulated gate bipolar transistor (IGBT), an integrated gate commutated thyristor (IGCT), an injection enhanced gate transistor (IEGT) or the like. The first bridge arm is formed with power switches S11 and S12. The second bridge arm is formed with power switches S21 and S22. A node between power switches S11 and S12 is connected to the output terminal OUT1 of the bridge circuit, and a node between power switches S21 and S22 is connected to the output terminal OUT2 of the bridge circuit. It can be easily known that two values of AC voltage, i.e. $U_{dc}$ (+$U_{dc}$ or –$U_{dc}$) and 0 V, can be outputted between the output terminals OUT1 and OUT2 of the H-bridge circuit by controlling grid pulse signals of the power switches S11, S12, S21 and S22. More particularly, when the power switches S11 and S22 are turned on, the voltage between the output terminals OUT1 and OUT2 is +$U_{dc}$; when the power switches S11 and S21 are turned on, the voltage between the output terminals OUT1 and OUT2 is 0 V; and when the power switches S12 and S21 are turned on, the voltage between the output terminals OUT1 and OUT2 is –$U_{dc}$.

In a preferred embodiment, the inverter circuit may also include a DC-DC converter (not shown) electrically connected between the energy storage unit 111 and the H-bridge circuit, thereby converting the DC voltage provided from the energy storage unit 111 into a DC input voltage matching the H-bridge circuit. For example, when the DC voltage $U_{dc}$ of the energy storage unit 111 is 12 V and the DC voltage required on the DC side of the H-bridge circuit is 5 V, the DC-DC converter can be used to complete the conversion from DC 12 V to DC 5 V.

Figure 4:
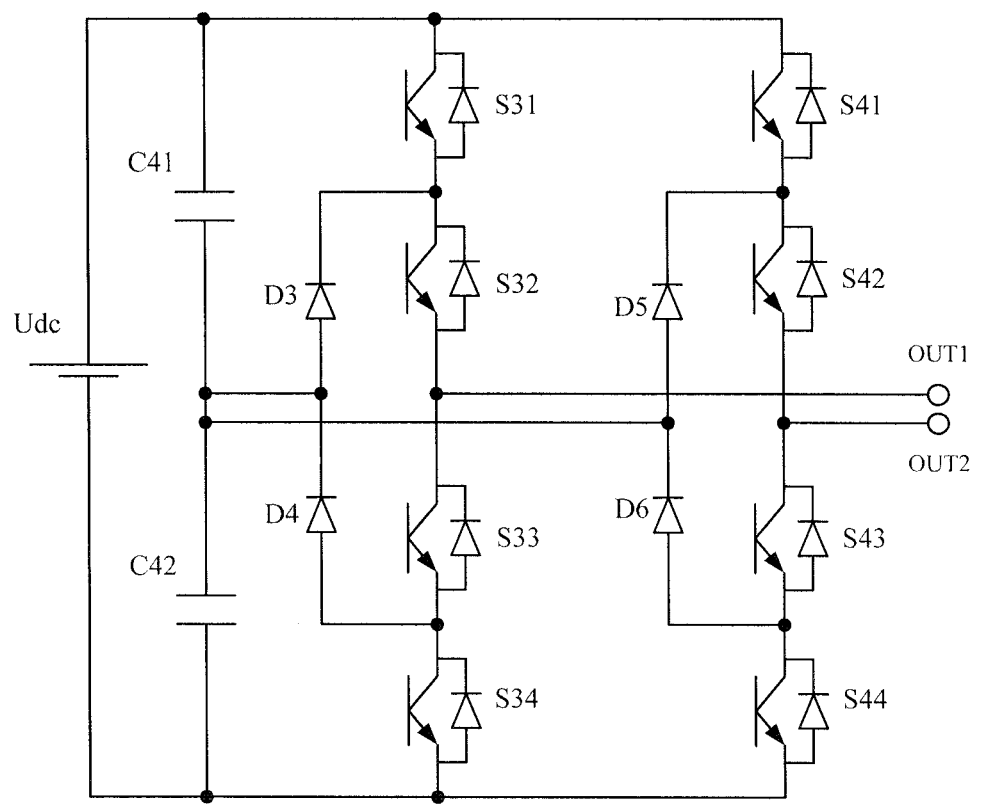
FIG. 4 illustrates a schematic circuit diagram showing another preferred embodiment of the inverter circuit in the converter module of FIG. 2.

FIG. 4 illustrates a schematic circuit diagram showing another preferred embodiment of the inverter circuit in the converter module of FIG. 2. Referring to FIG. 4, when the H-bridge circuit of the inverter circuit is the three-level H-bridge, the first bridge arm or the second bridge arm of the H-bridge circuit is formed with a first power switch, a second power switch, a third power switch and a fourth power switch connected in series. For example, the power switches are IGBTs. The first bridge arm is formed with IGBTs S31, S32, S33 and S34 connected in series, and the second bridge arm is formed with IGBTs S41, S42, S43 and S44 connected in series.

Moreover, a node which between the IGBTs S32 and S33 on the first bridge arm is connected to the output terminal OUT1 of the bridge circuit, and a node between the IGBTs S42 and S43 on the second bridge arm is connected to the output terminal OUT2 of the bridge circuit. For example, the output terminals OUT1 and OUT2 are connected to one of the three-phase AC electrical grid through a coupling reactor or to another inverter circuit adjacent to the inverter circuit in the same converter module. Clamping semiconductor switching devices (such as diodes D3 and D4) connected in series are arranged between a node which between IGBTs S31 and S32 and a node which between IGBTs S33 and S34; and similarly, clamping semiconductor switching devices (such as diodes D5 and D6) connected in series are arranged between a node which between IGBTs S41 and S42 and a node which between IGBTs S43 and S44. Preferably, the capacitor C includes a first capacitor C41 and a second capacitor C42 connected in series, and respective nodes between the first capacitor C41 and the second capacitor C42 are electrically connected to a node between the clamping diodes D3 and D4, and to a node between the clamping diodes D5 and D6. Thus, the node voltage between the capacitors C41 and C42 is stabilized at a midpoint potential of the DC voltage $U_{dc}$ of the energy storage unit, such as the midpoint potential corresponding to +½$U_{dc}$ and –½$U_{dc}$, i.e. 0 V.

Similar to FIG. 3, three values of AC voltage, i.e. $U_{dc}$ (+$U_{dc}$ or –$U_{dc}$), ½$U_{dc}$ (+½$U_{dc}$ or –½$U_{dc}$) and 0 V are outputted between the output terminals OUT1 and OUT2 of the H-bridge circuit by controlling the grid pulse signals of the IGBTs S31, S32, S33 and S34 on the first bridge arm and the grid pulse signals of the IGBTs S41, S42, S43 and S44 on the second bridge arm. Taking the four IGBTs S31-S34 on the first bridge arm as examples, when the IGBTs S31 and S32 are turned on and the IGBTs S33 and S34 are turned off, the electric potential of the output terminal OUT1 is +½$U_{dc}$; when the IGBTs S32 and S33 to are turned on and the IGBTs S31 and S34 are turned off, the electric potential of the output terminal OUT1 is 0 V; and when the IGBTs S33 and S34 are turned on and the IGBTs S31 and S32 are turned off, the electric potential of the output terminal OUT1 is –½$U_{dc}$. It can be easily known that after timing control is performed on the grid pulse signals of the four IGBTs S41-S44 on the second bridge, the value of the AC voltage between the output terminals OUT1 and OUT2 is $U_{dc}$, ½$U_{dc}$ and 0 V.

Figure 5A:
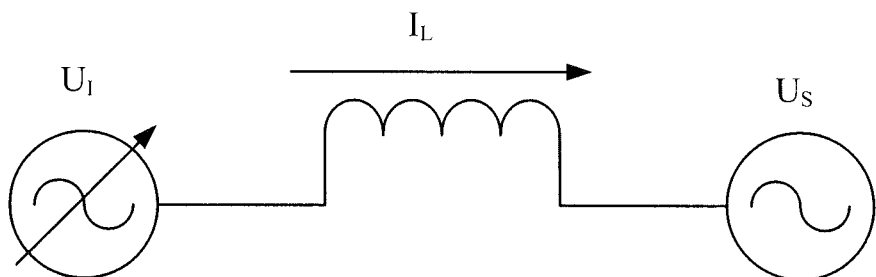
FIG. 5A illustrates an equivalent circuit diagram in which the converter module of FIG. 2 provides reactive power compensation to an electrical grid.

FIG. 5A illustrates an equivalent circuit diagram in which the converter module of FIG. 2 provides reactive power compensation to an electrical grid. For the equivalent circuit diagram of reactive power compensation in FIG. 5A, FIG. 5B illustrates a schematic vector diagram of the corresponding reactive power current when the AC output voltage of the converter module is higher than a voltage of the electrical grid, and FIG. 5C illustrates a schematic vector diagram of the corresponding reactive power current when the AC output voltage of the converter module is lower than the voltage of the electrical grid.

Figure 5B:
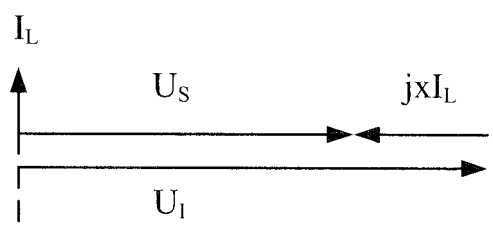
FIG. 5B, based on the equivalent circuit of FIG. 5A, illustrates a schematic vector diagram of the corresponding reactive power current when the AC output voltage of the converter module is higher than the voltage of the electrical grid.
Figure 5C:
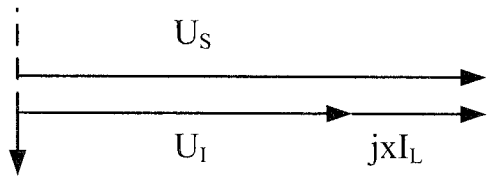
FIG. 5C, based on the equivalent circuit of FIG. 5A, illustrates a schematic vector diagram of the corresponding reactive power current when the AC output voltage of the converter module is lower than the voltage of the electrical grid.

Referring to FIG. 5A, if the AC electrical grid is regarded as a voltage source; the converter module is regarded as a controllable voltage source; and the coupling reactor between the AC electrical grid and the converter module is regarded equivalent with a linear impedance component, then in the equivalent circuit diagram, the AC voltage outputted from the converter module is $U_I$; the voltage of the AC electrical grid is $U_S$; and the current passing through the linear impedance component is $I_L$, and it can be known from the relationship between the $U_I$ and $U_S$ that:

1) when $U_I$ is equal to $U_S$, the current $I_L$ passing through the linear impedance component is zero, and at this time, the converter module neither provides reactive power nor absorbs reactive power;

2) as shown in FIG. 5B, when $U_I$ is larger than $U_S$, the voltage loaded on the linear impedance component is j×$I_L$ (i.e. $U_I$–$U_S$), and the phase of the current $I_L$ passing through the linear impedance component exceeds the phase of the voltage loaded on the linear impedance component by about 90 degrees, and at this time, the converter module sends out inductive reactive power. Moreover, the amplitude of the current $I_L$ is controlled continuously by adjusting the AC voltage $U_I$ outputted from the converter module, so as to continuously adjust the reactive power sent out from the converter module; and 3) as shown in FIG. 5C, when $U_I$ is lower than $U_S$, the voltage loaded on the linear impedance component is $-j \times I_L$ (i.e. $U_I - U_S$), and the phase of the current $I_L$ passing through the linear impedance component lags behind the phase of the voltage loaded on the linear impedance component by about 90 degrees, and at this time, the converter module sends out capacitive reactive power. Moreover, the amplitude of the current $I_L$ is controlled continuously by adjusting the AC voltage $U_I$ outputted from the converter module, so as to continuously adjust the reactive power sent out from the converter module.

Figure 6:
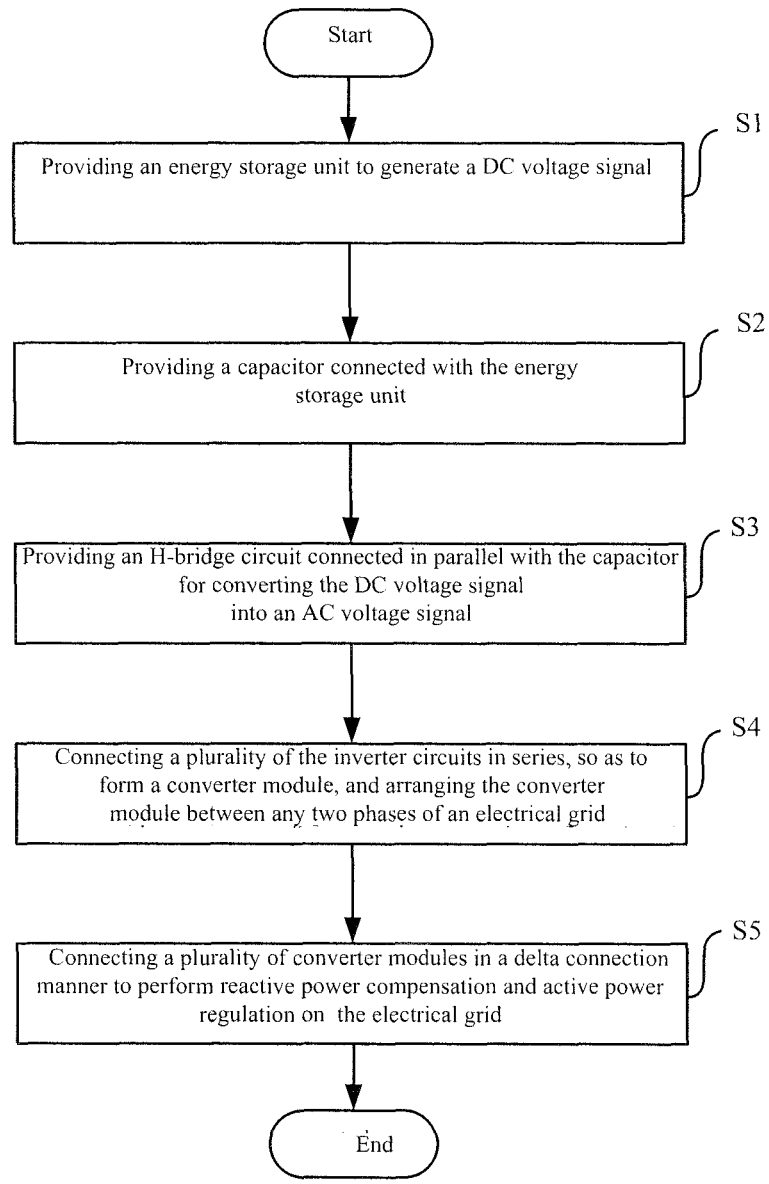
FIG. 6 illustrates a flow chart of a power compensation method for the renewable energy system according to another aspect of the present invention.

FIG. 6 illustrates a flow chart of a power compensation method for the renewable energy system according to another aspect of the present invention. In the power compensation method, step S1 is performed first, in which an energy storage unit is provided to generate a DC voltage. Preferably, the energy storage unit is a battery, a DC power supply or a super capacitor. Then, at steps S2 and S3, a capacitor and an H-bridge circuit are sequentially provided. The capacitor is connected to the energy storage unit. The H-bridge circuit is connected in parallel to the capacitor for converting the DC voltage into an AC voltage. An inverter circuit is formed with the H-bridge circuit, the energy storage unit and the capacitor. Subsequently, at step S4, a plurality of inverter circuits are connected in series so as to form a converter module, and the converter module is arranged between any two phases of the electrical grid. At last, step S5 is performed, in which a plurality of the converter modules are connected in a delta connection, to perform reactive power compensation and active power regulation on the electrical grid.

In a specific embodiment, the H-bridge circuit has a first bridge arm and a second bridge arm, wherein a first output terminal on the first bridge arm is electrically connected to one of any two phases of the electrical grid through a coupling device (such as a reactor), and a second output terminal on the second bridge arm is connected in series to another inverter circuit adjacent to the inverter circuit.

In another specific embodiment, the power compensation method also includes the following steps: providing a DC-DC converter electrically connected between the energy storage unit and the H-bridge circuit, thereby converting the DC voltage provided from the energy storage unit into the DC input voltage matching the H-bridge circuit. For example, when the DC voltage of the energy storage unit is lower than the DC voltage matching the H-bridge circuit, a boost DC-DC converter is disposed, so as to obtain a voltage higher than the DC voltage of the energy storage unit through conversion. On the contrary, when the DC voltage of the energy storage unit is higher than the DC voltage matched with the H-bridge circuit, a buck DC-DC converter is disposed, so as to obtain a voltage lower than the DC voltage of the energy storage unit through conversion.

In yet another specific embodiment, when the AC voltage outputted at the AC side of the converter module is higher than the voltage of the electrical grid, the converter module outputs inductive reactive power; and when the AC voltage outputted at the AC side of the converter module is lower than the voltage of the electrical grid, the converter module outputs capacitive reactive power.

In the power compensation apparatus and method of the present invention, a plurality of converter modules are respectively positioned between any two phases of a three-phase AC electrical grid in a delta connection. The DC voltage from the energy storage unit is converted into an AC voltage through the H-bridge circuit in the converter module, so as to provide the capacitive reactive power compensation or the inductive reactive power compensation to the AC electrical grid, thereby keeping the electrical grid voltage continuously stable when the electrical grid voltage fluctuates. Moreover, unlike the star connection, in the power compensation apparatus of the present invention, the delta-connected converter modules can also compensate the load current when the system load is not balanced. Moreover, active power compensation can also be provided to the electrical grid through the energy storage unit, so as to keep the frequency of the AC electrical grid stable, and thus the power compensation apparatus has the low voltage ride through function in a transient state.

In the foregoing descriptions, the specific embodiments of the present invention are described with reference to the accompanying drawings. However, those of ordinary skills in the art should understand that various modifications and variations can also be made to the specific embodiments of the present invention without departing from the spirit and scope of the present invention. These modifications and variations all fall in the scope defined by the claims of the present invention.

What is claimed is:

1. A power compensation apparatus which is used in a renewable energy system, the power compensation apparatus comprising:
    a plurality of converter modules positioned between any two phases of a three-phase alternating current (AC) electrical grid, wherein the converter module comprises a plurality of inverter circuits connected in series, and each of the inverter circuits has:
        an energy storage unit for providing a direct current (DC) voltage;
        a capacitor connected to the energy storage unit; and
        an H-bridge circuit connected to the capacitor in parallel for converting the DC voltage from the energy storage unit into an AC voltage, wherein the H-bridge circuit has a first bridge arm and a second bridge arm, and a first output terminal on the first bridge arm is electrically connected to one of any two phases of the electrical grid through a coupling device, and a second output terminal on the second bridge arm is connected in series to another inverter circuit adjacent to the inverter circuit,
    wherein, the converter modules are connected in a delta connection;
    wherein, when an output voltage of the converter module is higher than a voltage of the electrical grid, the converter module outputs inductive reactive power;
    when the output voltage of the converter module is lower than the voltage of the electrical grid, the converter module outputs capacitive reactive power; and
    when the voltage of the electrical grid drops, the power compensation apparatus provides reactive power compensation to keep the voltage of the electrical grid stable, and provides active power regulation so as to keep a frequency of the electrical grid stable.

2. The power compensation apparatus of claim 1, wherein the H-bridge circuit is a two-level H-bridge or a three-level H-bridge.

3. The power compensation apparatus of claim 2, wherein, when the H-bridge circuit is the two-level H-bridge, the first bridge arm or the second bridge arm is formed with two power switches connected in series.

4. The power compensation apparatus of claim 3, wherein the power switch has a reverse freewheeling diode connected in parallel between a first electrode and a second electrode of the power switch.

5. The power compensation apparatus of claim 2, wherein, when the H-bridge circuit is the three-level H-bridge, the first bridge arm or the second bridge arm is formed with a first power switch, a second power switch, a third power switch and a fourth power switch which are connected in series.

6. The power compensation apparatus of claim 5, wherein a first clamping semiconductor switching device and a second clamping semiconductor switching device connected in series are arranged between a first node which between the first power switch and the second power switch and a second node which between the third power switch and the fourth power switch, and a third node between the second power switch and the third power switch is electrically connected to one of any two phases of the electrical grid or to another inverter circuit adjacent to the inverter circuit.

7. The power compensation apparatus of claim 6, wherein the capacitor comprises a first capacitor and a second capacitor connected in series, and a forth node between the first capacitor and the second capacitor is electrically connected to a fifth node between the first clamping semiconductor switching device and the second clamping semiconductor switching device.

8. The power compensation apparatus of claim 1, wherein the energy storage unit is a battery, a DC power supply or a super capacitor.

9. The power compensation apparatus of claim 1, wherein the renewable energy system is a wind power system or a solar power system.

10. A power compensation method used in a renewable energy system, the method comprising:
providing an energy storage unit for generating a DC voltage;
providing a capacitor connected to the energy storage unit;
providing an H-bridge circuit connected in parallel with the capacitor for converting the DC voltage into an AC voltage;
forming an inverter circuit with the H-bridge circuit, the energy storage unit and the capacitor;
connecting a plurality of the inverter circuits in series to form a converter module, and arranging the converter module between any two phases of a three-phase AC electrical grid;
connecting a plurality of the converter modules in a delta connection so as to perform reactive power compensation and active power regulation on the electrical grid;
outputting inductive reactive power by the converter module when an output voltage of the converter module is higher than a voltage of the electrical grid;
outputting capacitive reactive power by the converter module when the output voltage of the converter module is lower than the voltage of the electrical grid; and
providing the reactive power compensation and the active power regulation, so as to respectively keep the voltage of the electrical grid and a frequency of the electrical grid stable when the voltage of the electrical grid drops.

11. The power compensation method of claim 10, wherein the H-bridge circuit has a first bridge arm and a second bridge arm, and a first output terminal on the first bridge arm is electrically connected to one of any two phases of the electrical grid through a coupling device, and a second output terminal on the second bridge arm is connected in series to another inverter circuit adjacent to the inverter circuit.

12. The power compensation method of claim 10, wherein the energy storage unit is a battery, a DC power supply or a super capacitor.

13. The power compensation method of claim 10, wherein the renewable energy system is a wind power system or a solar power system.

* * * * *